United States Patent Office.

GEORGE STOREY, OF WHEELING, WEST VIRGINIA.

Letters Patent No. 76,266, dated March 31, 1868; antedated March 20, 1868.

---

IMPROVED MODE OF TREATING MALT AND OTHER LIQUORS.

---

The Schedule referred to in these Letters Patent and making part of the same.

---

TO ALL WHOM IT MAY CONCERN:

Be it known that I, GEORGE STOREY, of Wheeling, in the county of Ohio, and State of West Virginia, have invented a new and improved Process of Treating Malt-Liquors and the Fermented Extracts of Cereals; and I do hereby declare the following to be a full, clear, and exact description of the same.

This invention relates to a new process for concentrating and condensing the alcohol, &c., and removing the organic properties liable to decomposition, contained in malt-liquors and other fermented extracts of grain, by means of freezing.

The method of treating liquors by this process is as follows: The ale, beer, porter, or others liquid to be acted upon, on suitable occasions during the winter season, may be placed in large, open, shallow vessels, so arranged as to expose a large area to the atmosphere, in order that it may be readily acted upon and rapidly frozen, or it may be exposed to the action of extreme cold, in air-tight vessels of such shape and capacity as may be found convenient, or be frozen in such other manner as further experiments may prove the most desirable. A partial freezing only will take place, and the remaining liquid is drawn off by any suitable means from the ice.

This operation, although extremely simple in itself, produces many very beneficial results. Upon investigation it will be found that the gluten, mucilage, albumen, and other organic chemical constituents liable to further fermentation or decomposition, have been separated by congealment, and have united with the excess of water to make a compound in the form of ice, leaving the remaining liquid almost entirely free from such constituents as promote decomposition, this result being produced without removing or destroying any of the valuable and desirable qualities of the liquid. Experiments with the saccharometer, acetimeter, and alcoholmeter have shown that from three to six per cent. of products liable to decomposition are removed, beside the water, the amount of the latter being from five to fifty per cent., depending somewhat upon the circumstances attending the fermentation.

The effect of converting a certain percentage of the fluid into a solid, and thus removing it, is to leave the remainder in a concentrated form, its undesirable portion, or those organic matters liable to deteriorate, having been removed with little or no loss of its valuable properties. Among other advantages connected with this condensation and concentration, the lessened expense attendant upon cooperage, storage, and transportation, will be readily apparent. The liquor being freed from its organic properties, liable to after-fermentation and decomposition, will keep sound and good for a greater length of time, and in any climate.

The usual additional expense connected with the manufacture of stock or keeping-ale, porter, and beer, will then be saved. In the making of these, about twice the quantity of hops is necessary than in the making fresh malt-liquors, this large excess being used principally to counteract the evil effects of the chemical constituents liable to after-fermentation or decomposition.

Large yields or extracts from the grain can also be obtained by using more water with the mash than would be practicable otherwise, the surplus being easily removed by this process. All necessity for return worts is also done away with by running greater length when brewing, the surplus of water being removed in this case also.

Malt-liquors treated by this process are found to have less sediment and to have an increased brilliancy over those treated in the usual manner. They possess also more saccharine matter and alcohol, and are almost free entirely from the organic matter that produces acetic acid, and consequently are much more conducive to health than when impregnated more or less with organic products liable to decomposition.

Of course this process can be carried on at any season of the year by the use of freezing-mixtures, but as cold weather is essential for the manufacture of the best malt-liquors, and desirable for the treatment of all fermentable extracts, this season is preferable to all others.

Having thus described my invention, what I claim as new, and desire to secure by Letters Patent, is—

The process of treating malt-liquors and the fermented extracts of cereals by freezing, substantially as herein described.

GEO. STOREY.

Witnesses:
 JOHN CRONIN,
 CHRIS. STOEHR.